(12) United States Patent
Wilding et al.

(10) Patent No.: US 6,811,120 B1
(45) Date of Patent: Nov. 2, 2004

(54) MODULAR SPAR TUNNEL

(75) Inventors: Joseph Ray Wilding, Elizabeth, CO (US); Dennis D. Olcott, Lone Tree, CO (US)

(73) Assignee: Adam Aircraft Industries, Inc., Englewood, CO (US)

( * ) Notice: Subject to any disclaimer, the term of this patent is extended or adjusted under 35 U.S.C. 154(b) by 0 days.

(21) Appl. No.: 10/414,390

(22) Filed: Apr. 15, 2003

(51) Int. Cl.[7] .................................................. B64C 1/06
(52) U.S. Cl. ...................... 244/119; 156/189; 264/219
(58) Field of Search ................................ 244/119, 120, 244/123; 156/189, 242, 245; 264/219, 242

(56) References Cited

U.S. PATENT DOCUMENTS

| | | | |
|---|---|---|---|
| 4,901,950 A | | 2/1990 | Judge |
| 5,062,589 A | | 11/1991 | Roth et al. |
| 5,216,799 A | * | 6/1993 | Charnock et al. ......... 29/525.02 |
| 5,223,067 A | * | 6/1993 | Hamamoto et al. ......... 156/173 |
| 5,863,365 A | | 1/1999 | Bird |
| 5,975,464 A | | 11/1999 | Rutan |
| 6,098,923 A | | 8/2000 | Peters, Jr. |
| 6,110,567 A | | 8/2000 | Bird |
| 6,190,484 B1 | * | 2/2001 | Appa ........................ 156/189 |
| 6,237,873 B1 | | 5/2001 | Amaoka et al. |
| 6,319,346 B1 | | 11/2001 | Clark et al. |
| 6,464,170 B2 | | 10/2002 | Carpenter |
| 6,475,320 B1 | * | 11/2002 | Masugi ....................... 156/189 |
| 6,502,788 B2 | * | 1/2003 | Noda et al. .................. 244/123 |
| 6,521,152 B1 | | 2/2003 | Wood et al. |
| 6,547,185 B2 | | 4/2003 | Erben et al. |
| 6,553,734 B1 | | 4/2003 | McKague, Jr. et al. |
| 6,554,226 B2 | | 4/2003 | Bold et al. |
| 2002/0056788 A1 | * | 5/2002 | Anderson et al. ............ 244/119 |
| 2002/0078545 A1 | * | 6/2002 | Munk et al. .............. 29/407.01 |
| 2003/0146346 A1 | * | 8/2003 | Chapman, Jr. .............. 244/123 |

OTHER PUBLICATIONS

Adam Aircraft Industries, www.adamaircraft.com/ManufacturingProgress500.asp, Mar. 28, 2003, pp. 1–11.

* cited by examiner

*Primary Examiner*—Jack Keith
*Assistant Examiner*—Gabriel S. Sukman
(74) *Attorney, Agent, or Firm*—Wiley, Rein & Fielding, LLP

(57) ABSTRACT

A system and method for adjusting a location of a center of gravity of an aircraft relative to a center of lift of awing of the aircraft. In one innovative aspect, a modular spar tunnel mold is provided and configured to be detachably fixed at a selected location within a main for a fuselage portion of the aircraft.

5 Claims, 2 Drawing Sheets

MODULAR SPAR TUNNEL

FIELD OF THE INVENTION

The present invention relates to aircraft manufacturing systems and methods. In particular, but not by way of limitation, the present invention relates to systems and methods for shifting, or repositioning, an aircraft fuselage on a wing during aircraft development or manufacture to adjust the center of gravity (CG) location of a resulting aircraft.

BACKGROUND OF THE INVENTION

In the avionics field, proper positioning of the center of gravity (CG) of an aircraft is essential. For example, if the CG of an aircraft is positioned too far forward of the aerodynamic center of the wing, a pilot can experience significant difficulty in attempting to control the aircraft during flight. Similarly, if the CG of the aircraft is positioned to far aft of the aerodynamic center of the wing, the aircraft will become inherently unstable.

Stated somewhat differently, in order to maintain proper stability of an aircraft, the CG should not under any condition of fuel loading, passenger loading, cargo loading, or any other type of loading be positioned rearward of a rear stability limit. And, in order to maintain proper control, for example, during take offs and landings, the CG should never be positioned forward of the aerodynamic limit of the aircraft.

One, thus, can readily understand that, when design criteria are altered for an aircraft, such as when a different passenger seating configuration is selected or a different propulsion system is selected, it can become necessary to shift, or reposition, the fuselage of an aircraft on its wing. And, where conventional aircraft manufacturing systems and techniques are employed, this can result in a complete redesign of the aircraft and the tools used to build or assemble it.

Those skilled in the art of aircraft manufacture and design will appreciate, therefore, that a need exists for an improved method of repositioning a fuselage on a wing, when significant design changes are encountered in an aircraft development process.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one particularly innovative aspect, the present invention is directed to systems and methods for adjusting the location of the CG of an aircraft by shifting, or repositioning, the fuselage of an aircraft on its wing without requiring a complete retooling of the fuselage and wing assembly.

In one presently preferred embodiment, a modular spar tunnel is provided within a mold for constructing a fuselage section of an aircraft. The modular spar tunnel is configured to engage, or be mounted within, a main mold for a portion (typically the right or left side) of the fuselage of the aircraft. In this fashion, the spar tunnel of an aircraft can be shifted forward or rearward within a fuselage section of an aircraft without a major retooling operation, and without modifying other elements or aspects of the aircraft. Thus, if a different propulsion system is selected for an aircraft design, major retooling of the molds used to manufacture the aircraft may not be required.

In another innovative aspect, the present invention is directed to a method for assembling a fuselage of an aircraft using a multi-component molding and composite manufacturing process. A modular spar tunnel of the type described above is utilized to locate a spar tunnel within a fuselage of an aircraft, and layers of composite fiber are laid up within the mold, and thereafter cured, to form a portion of the fuselage of the aircraft. Using methods in accordance with the present invention, it is possible to accommodate significant design variations between aircraft without engaging in a major retooling process and incurring the costs associated with such retooling.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
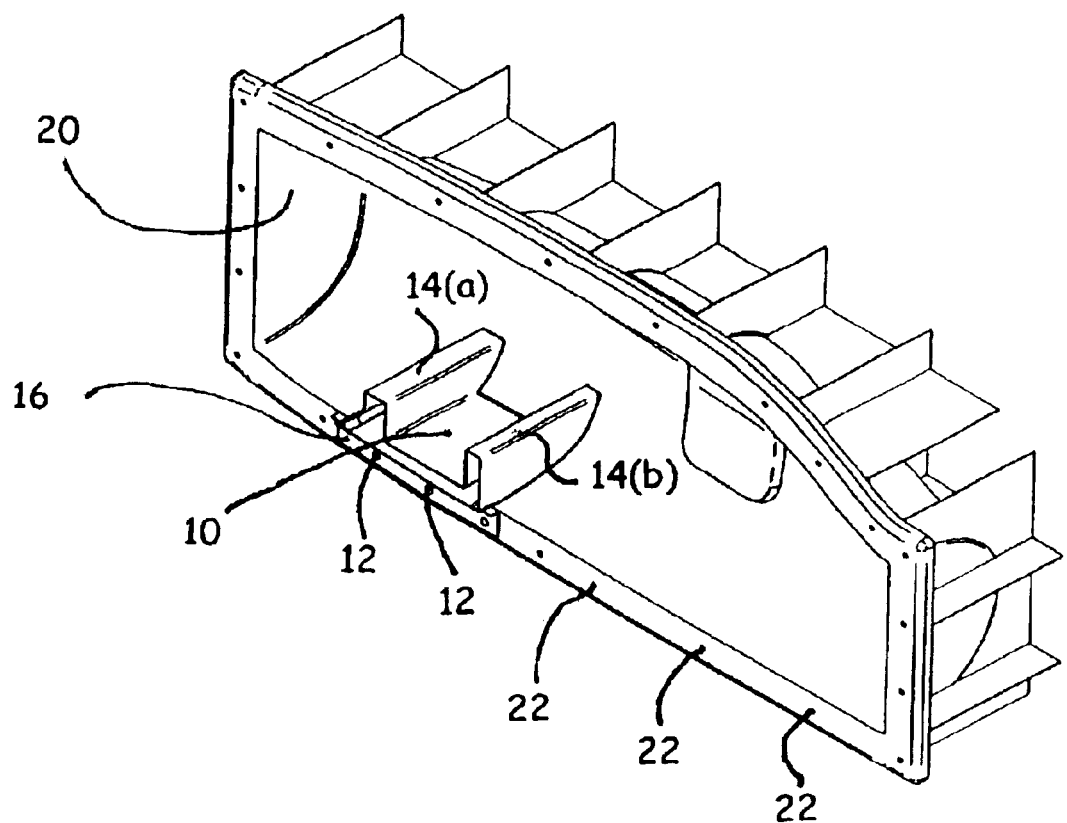
FIG. 1 is an illustration of a mold incorporating a modular spar tunnel in accordance with a preferred form of the present invention.

Referring now to the drawings, where like or similar elements are designated with identical reference numerals throughout the several views, and referring in particular to FIG. 1, a modular spar tunnel tool 10 is shown mounted within a mold 20 for a portion of an airplane fuselage. A preferred form of the modular spar tunnel tool is shown in FIG. 2.

As shown in the drawings, the mold 20 has provided thereon a plurality of raised members 22 that preferably are designed to engage a corresponding set of recesses 12 provided within the modular spar tunnel tool 10. Thus, by adjusting the position of the modular spar tunnel tool 10 within the mold 20, the location of the spar tunnel of an aircraft can be readily adjusted to adjust for other design criteria, such as modifications to a seating arrangement or substitution of a propulsion system.

Figure 2:
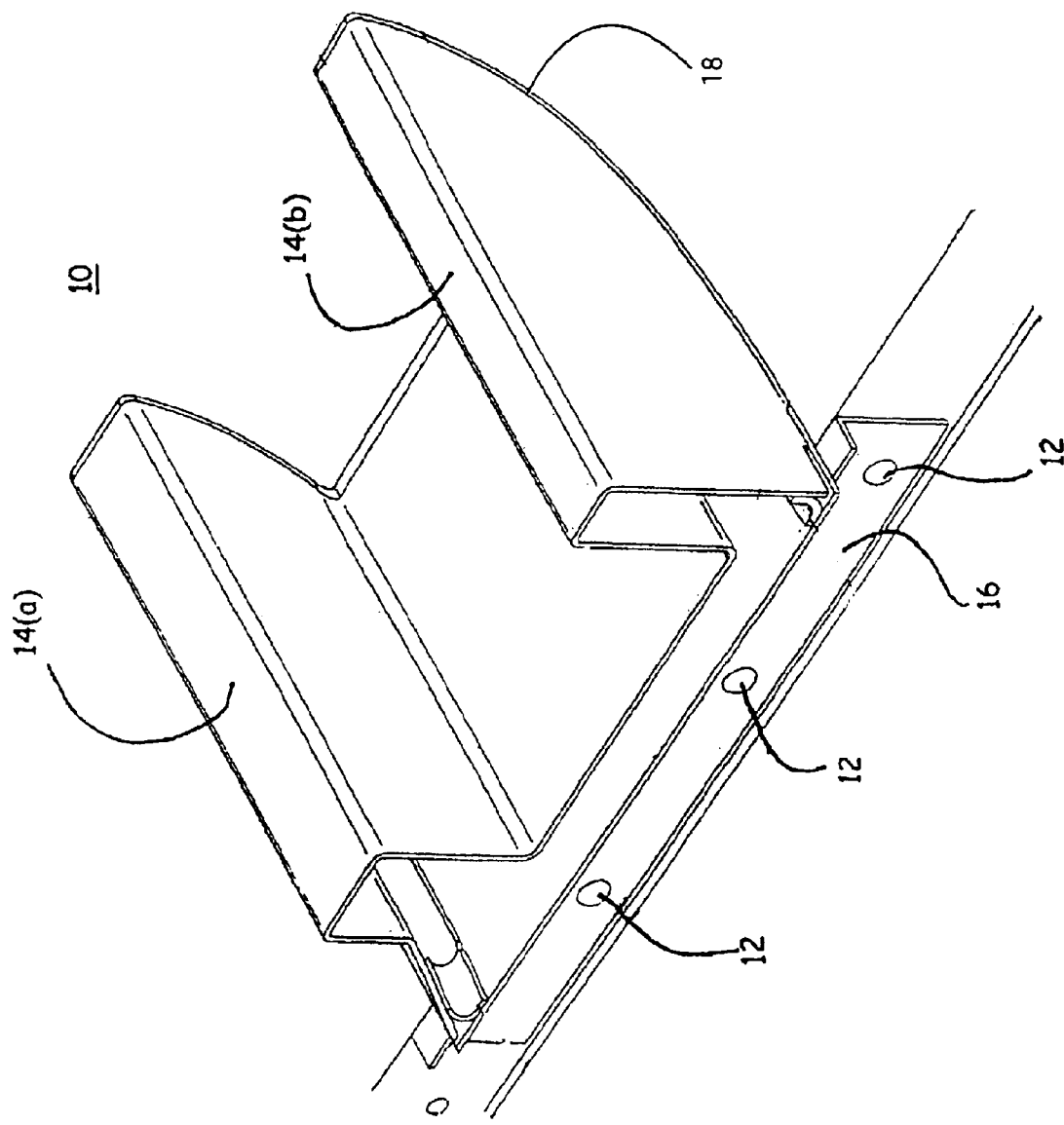
FIG. 2 is an enlarged illustration of a modular spar tunnel in accordance with a preferred form of the present invention.

Turning now in detail to FIG. 2, the modular spar tunnel tool 10 preferably is manufactured from composite materials, such as carbon fiber or KEVLAR™, but those skilled in the art will understand that the modular spar tunnel tool 10 also can be manufactured from metal, such as aluminum, or any other material, so long as the material can withstand the conditions present in a typical composite curing process.

The modular spar tunnel tool 10 preferably includes a pair of raised sections 14(a) and 14(b) for defining the spar tunnel of an aircraft fuselage and a mounting plate 16 for engaging the mold 20 for the main aircraft fuselage. As noted above, the mounting plate 16 preferably has a plurality of recesses 12 formed therein for receiving a corresponding set of raised or protruding members 22 provided on the mold 22. In a currently preferred form, the recesses 12 may have a semi-spherical shape corresponding to a semi-spherical shape of the raised or protruding members 22.

Those skilled in the art, however, will appreciate that numerous other methodologies can be employed for positioning the modular spar tunnel tool within the main mold 20, and that the present invention should not be limited to the particular embodiments described herein. For example, in alternative embodiments, the raised or protruding members 22 can take the form of pins, and the recesses 12 can take the form of a plurality of holes provided in the mounting plate 16 of the modular spar tunnel tool 10.

Those skilled in the art also will appreciate that the main body 18 (including the raised sections 14(a) and 14(b)) and the mounting plate 16 of the modular spar tunnel tool 10 can be manufactured as a single unit or, alternatively, the various portions of the modular spar tunnel tool 10 can be manufactured separately and combined prior to being placed within the main mold 20.

Finally, those skilled in the art will appreciate that, where a modular spar tunnel tool 10 in accordance with various forms of the present invention is used to manufacture a series of aircraft, adjustments to the spar location of the aircraft can be made relatively easily without significant retooling of the manufacturing process. This allows aircraft manufacturers using a modular spar tunnel tool 10 in accordance with the present invention to much more quickly respond to customer design change requests and other design and development issues that may arise during the creation of a line of aircraft.

In conclusion, the present invention provides, among other things, an improved system and method for manufacturing a series of aircraft and, in particular, an improved system and method for adjusting the CG and/or spar tunnel location within a series of aircraft. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for adjusting a location of a center of gravity of an aircraft relative to an aerodynamic center of lift of a wing of the aircraft during a manufacturing operation, the method comprising:

providing a first mold of a portion of a fuselage of an aircraft;

providing a second mold for a portion of a spar tunnel of said fuselage, said second mold being configured for adjustable mounting within said first mold; and detachably fixing said second mold at a desired location within said first mold, such that said mold may be repositioned within said first mold at a later time.

2. The method of claim 1, wherein said first mold has a plurality of raised protrusions extending from an edge thereof, said second mold has a plurality of recesses formed within an edge thereof for receiving a subset of said protrusions of said first mold, and said step of detachably fixing said second mold within said first mold includes positioning said second mold in said first mold in a manner such that a desired subset of said raised protrusions of said first mold extend into said recesses formed within said second mold.

3. The method of claim 1, wherein said first mold has a plurality of pins extending from an edge thereof, said second mold has a plurality of holes formed within an edge thereof for receiving a subset of said pins of said first mold, and said step of detachably fixing said second mold within said first mold includes positioning said second mold in said first mold in a manner such that a desired subset of said pins of said first mold extend through said holes formed within said second mold.

4. A method for defining a relationship between a center of gravity and center of aerodynamic lift of an aircraft, said aircraft being one of a plurality of aircraft to be manufactured using common main fuselage molds, the method comprising:

providing main fuselage molds for opposing portions of a fuselage of said aircraft;

providing spar tunnel molds for opposing portions of said fuselage of said aircraft, each spar tunnel mold being configured for detachable mounting within a respective one of said main fuselage molds; and detachably mounting said spar tunnel molds at selected locations within said respective main fuselage molds.

5. An apparatus for fixing a center of gravity of an aircraft relative to an aerodynamic center of lift of a wing of the aircraft, the system comprising:

a first mold for forming a portion of a fuselage of said aircraft;

a second mold for forming a portion of a spar tunnel of said fuselage, said second mold being configured for adjustable mounting within said first mold; and means for detachably fixing said second mold at a desired location within said first mold.

* * * * *

UNITED STATES PATENT AND TRADEMARK OFFICE
CERTIFICATE OF CORRECTION

PATENT NO. : 6,811,120 B1
DATED : November 2, 2004
INVENTOR(S) : Joseph Ray Wilding et al.

It is certified that error appears in the above-identified patent and that said Letters Patent is hereby corrected as shown below:

Title page,
Item [57], ABSTRACT,
Line 2, change "awing" to -- a wing --.
Line 5, change "main for" to -- main mold for --

Signed and Sealed this

Third Day of May, 2005

JON W. DUDAS
*Director of the United States Patent and Trademark Office*